(12) United States Patent
Prabhudesai

(10) Patent No.: US 9,656,542 B2
(45) Date of Patent: May 23, 2017

(54) RADIATOR GRILLE

(71) Applicant: K J Somaiya College of Engineering, Mumbai (IN)

(72) Inventor: Avinash Atmaram Prabhudesai, Maharashtra (IN)

(73) Assignee: K J Somaiya College of Engineering, Mumbai (IN)

( * ) Notice: Subject to any disclaimer, the term of this patent is extended or adjusted under 35 U.S.C. 154(b) by 0 days.

(21) Appl. No.: 15/033,122

(22) PCT Filed: Oct. 31, 2014

(86) PCT No.: PCT/IN2014/000698
§ 371 (c)(1),
(2) Date: Apr. 29, 2016

(87) PCT Pub. No.: WO2015/075746
PCT Pub. Date: May 28, 2015

(65) Prior Publication Data
US 2016/0257193 A1    Sep. 8, 2016

(51) Int. Cl.
*B60K 11/08*    (2006.01)
*B60R 19/48*    (2006.01)
*B60K 11/04*    (2006.01)
*B60R 19/52*    (2006.01)

(52) U.S. Cl.
CPC ............. *B60K 11/08* (2013.01); *B60K 11/04* (2013.01); *B60R 19/52* (2013.01); *B60R 2019/525* (2013.01)

(58) Field of Classification Search
CPC ........ B60K 11/08; B60K 11/085; B60R 19/48
See application file for complete search history.

(56) References Cited

U.S. PATENT DOCUMENTS

| | | | |
|---|---|---|---|
| 1,571,354 A * | 2/1926 | Whitacre | B60R 19/52 165/134.1 |
| 2,542,238 A | 2/1951 | Dreyfuss | |
| 3,888,327 A * | 6/1975 | Reece | B60K 11/04 180/68.6 |
| 5,765,630 A | 6/1998 | Bloomer | |

* cited by examiner

*Primary Examiner* — Bryan Evans
(74) *Attorney, Agent, or Firm* — DeLio, Peterson & Curcio, LLC; Robert Curcio

(57) ABSTRACT

A self-cleaning radiator grille assembly having a radiator housing, a plurality of trash filter units forming a grill plate held by a frame wherein each of the plurality of trash filter units has at least one pair of filter lines, a plurality of corrugated sheets placed between the filter lines and parallel to each other such that hollow spaces between the corrugated sheets form air conduits for facilitating removal of clogging agents.

16 Claims, 6 Drawing Sheets

RADIATOR GRILLE

FIELD OF THE INVENTION

The present invention generally relates to radiator grille assembly.

BACKGROUND OF THE INVENTION

A radiator grille is used to protect the radiator of vehicles against external agents such as dust, mud, fragments of waste etc. A radiator grille generally includes thin slits in a metal or plastic sheet that acts as a barrier against any foreign particles from entering the radiator.

Currently known radiator grilles include a perforated grille member. The grille member facilitates the accumulated chaff to fall off by gravity and vibration. However, the air entering the perforated grill has a direction perpendicular to the grill surface because of which the air tends to press the chaff against the grill surface and does not allow easy movement of chaff parallel to grill surface. This causes grill blockage by chaff and the operator is required to clean the grille member leading to frequent stoppages. Therefore, there is a need for a radiator grille assembly which can self-clean itself so that stoppages can be avoided.

Combined grille and moving screen radiator structures are also well known in the art. In such arrangements the continuously moving endless screen filters the chaff. The screen itself is cleaned by a moving brush at the bottom. Such structures are usually of self-cleaning type but need additional drive and energy for the continuous movement of screen and brush. Other arrangements used for the same purpose are either a radiator fan reversing its direction of rotation at a regular interval or a radiator fan whose blades move around their individual axes at regular interval. In both these arrangements direction of air flow through the radiator grille reverses itself at regular time intervals for cleaning the radiator grille. Both these arrangements require a control system for periodically reversing the air flow which makes them expensive. Moreover cleaning is not continuous. Chaff keeps on accumulating on grill, blocking the grill and reducing air flow to radiator until the direction of the air flow reverses. Also, the fan blades undergo regular stress reversal and to avoid frequent fan blade breakage these arrangements require more expensive fans.

The existing radiator grilles are either unable to avoid clogging by fibers, chaff, leafy materials, etc. which form a fibrous matrix over the radiator grille or they prevent clogging but require additional drives, additional energy input and are more expensive to make and maintain.

In view of the above, there is a need of a radiator grille that overcomes the problems associated with the prior arts.

SUMMARY OF THE INVENTION

Accordingly, the present invention provides a self-cleaning radiator grille assembly comprising a radiator housing having a frame operable in an open and/or closed position; and a plurality of trash filter units forming a grill plate held by the frame wherein each of the plurality of trash filter units include at least one pair of filter lines, a plurality of corrugated sheets placed between each of the filter lines and parallel to each other such that hollow spaces between the corrugated sheets form air conduits, wherein an ambient air entering the air conduits facilitates removal of clogging agents by pushing the agents down an incline thereby enabling self-cleaning.

In an advantageous aspect, the present invention provides a continuous self-cleaning radiator grille thereby continuously ensuring blockage-free air passage to radiator.

The self-cleaning characteristic of the present invention is advantageous in avoiding frequent machine stoppages for cleaning of the radiator grille.

The radiator grille of the present invention can be utilized in wide range of industrial applications such as automobiles, farm equipment, etc.

The radiator grille of the present invention filters the fibrous and leafy material in the ambient air effectively. Only a small amount of chaff and clogging agents which are of a minute size may reach the radiator. These chaff and clogging agents are then sucked out due to the suction force created by radiator fan.

The radiator grille of the present invention requires no additional drive or additional energy input as compared to ordinarily used fan radiator assembly. It does not require any control system. Hence, it is cost effective and easy to maintain.

DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DESCRIPTION OF THE PREFERRED EMBODIMENTS

Figure 1:
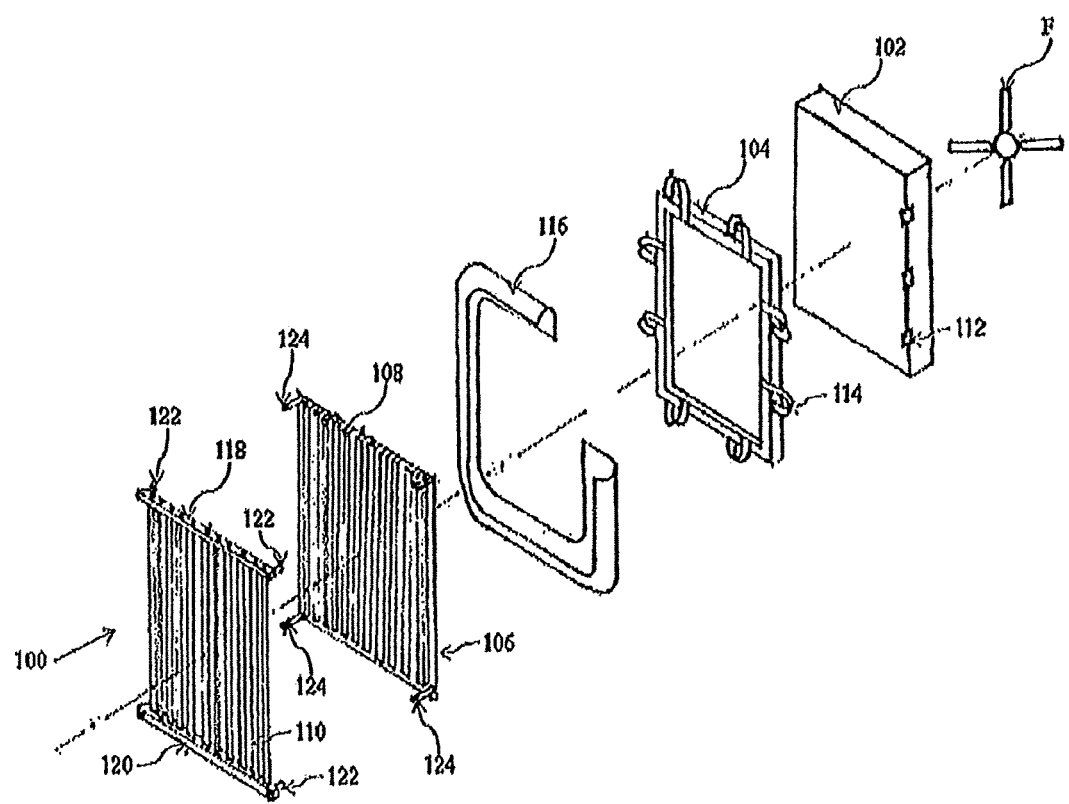
FIG. 1 is an isometric view of the radiator grille assembly (100) in accordance with an embodiment of the invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the particular embodiment illustrated.

The subject matter is now described with reference to the drawings, wherein like reference numerals are used to refer to like elements throughout. In the following description, for purposes of explanation, numerous specific details are set forth in order to provide a thorough understanding of the subject matter. It may be evident however, that such matter can be practiced without these specific details. In other instances, well-known structures are shown in diagram form in order to facilitate describing the invention.

FIG. 1 illustrates a radiator grille assembly (100) in accordance to an embodiment of the invention. The radiator grille assembly (100) includes a radiator housing (102), a frame (104), a grill plate (106), at least one trash filter unit (108) and at least one baffle (110).

In an embodiment the radiator grille assembly (100) includes the radiator housing (102). The radiator housing (102) is a rectangular box-shaped structure and houses the radiator (not shown). The frame (104) is attached inside the radiator housing (102) such that the frame (104) can be swung in open or closed positions. The frame (104) holds the grill plate (106). The grille plate (106) is made up of a plurality of trash filter units (108). A trash filter unit (108) is covered by a baffle (110).The baffle 110 is a smooth stiff sheet bent to match a cross sectional profile of the trash filter unit (108). There is at least one of baffle (110) covering each of the corresponding trash filter units (108).

The frame (104) is hinged to the radiator housing (102) by hinges (112). The hinges (112) facilitate the swinging of the frame (104) in open or closed position of the radiator housing (102).

The frame (104) holds the grill plate (106) using flexible links (14) thereby providing support to the grill plate (106). The entire periphery of space between the frame (104) and the grill plate (106) is encompassed by a flexible shroud (116). The flexible shroud (116) covers entirely the flexible links (114) from outside. The flexible shroud (116) along with frame (104) and grill plate (106) ensure passage of air to radiator housing (102) only through the trash filter units (108). The flexible shroud (116) binds the frame (104) and the grill plate (106) together.

In an embodiment of the present invention, the plurality of baffles (110) is held together between top holder (118) and bottom holder (120). The baffle (110) is converging over their trash filter unit (108) when the top holder (118) and bottom holder (120) are fixed with the grill plate (106).

The top holder (118) and bottom holder (120) are fixed with the grill plate (106) by spacers (122) and bolts (124).

Figure 2:
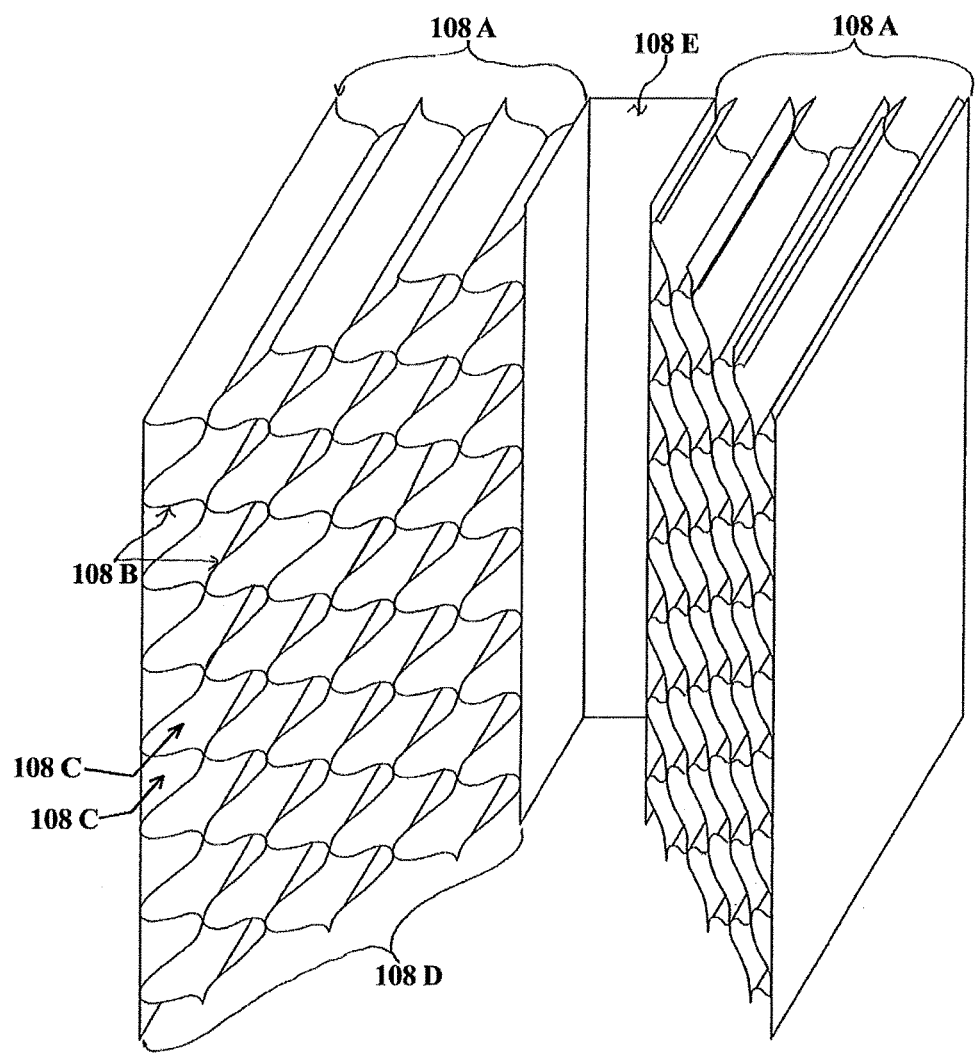
FIG. 2 is an isometric view of a trash filter unit (108) with at least two pair of filter lines (108-A) and plurality of corrugated sheets (108-B) in accordance with an embodiment of the invention.

FIG. 2 illustrates a trash filter unit (108) of an embodiment of the present invention. The trash filter unit (108) includes at least one pair of filter lines (108-A), a plurality of corrugated sheets (108-B) placed between the filter lines (108-A) and parallel to each other such that hollow spaces between the corrugated sheets form air conduits (108-C).

In an embodiment, the corrugated sheets are parallel to the filter lines.

Figure 2A:
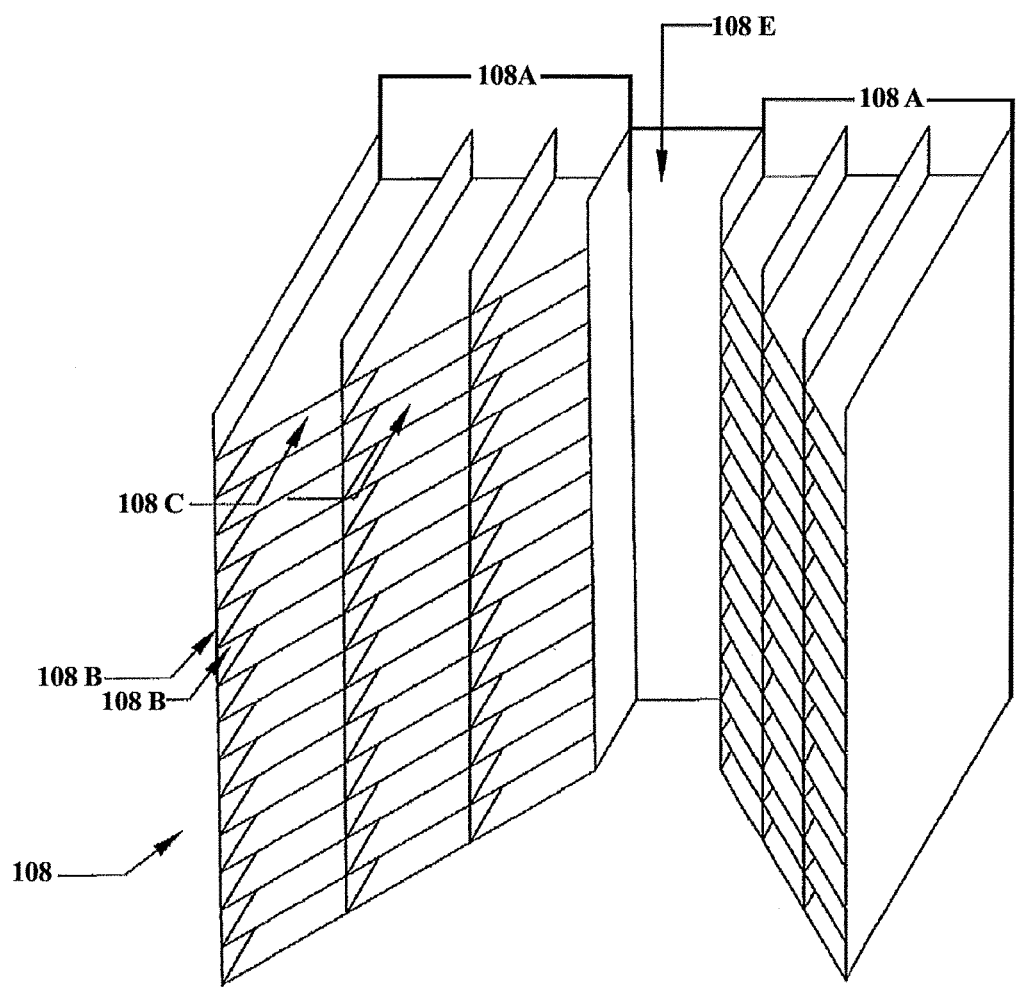
FIG. 2A shows a trash filter unit (108) with at least two pair of filter lines (108-A) and plurality of corrugated sheets (108-B) placed one above the other in accordance with an embodiment of the invention.

In an embodiment, the corrugated sheets (108-B) are placed one above the other as shown in FIG. 2A.

In an embodiment, the air conduits (108-C) together are opening at an incline (108-D) such that an open trash passage (108-E) is created between the at least one pair of filter lines (108-A) of each trash filter unit (108) wherein each filter line (108-A) includes a plurality of corrugated sheets (108-B) placed one above the other as shown in FIG. 2A.

Figure 3:
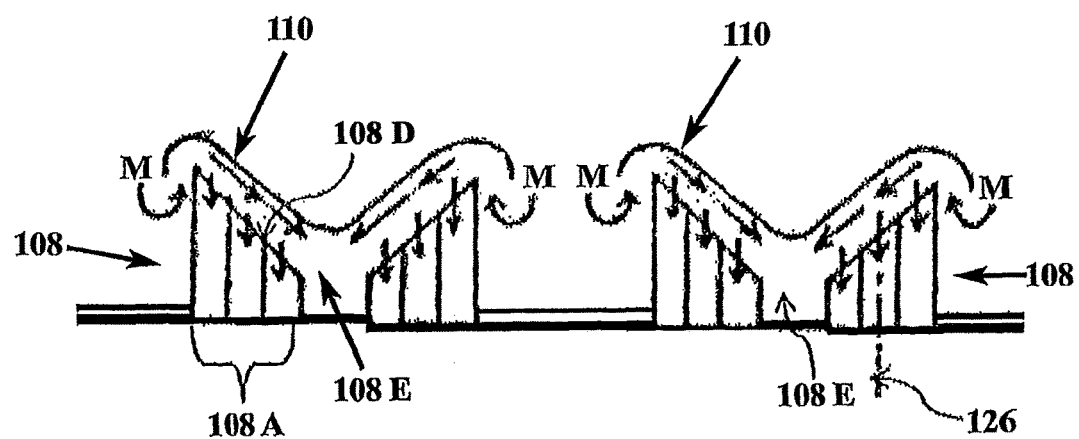
FIG. 3 is a sectional top view of trash filter units (108) having two baffles (110) assembled near the trash filter unit in accordance with an embodiment of the invention.
Figure 4:
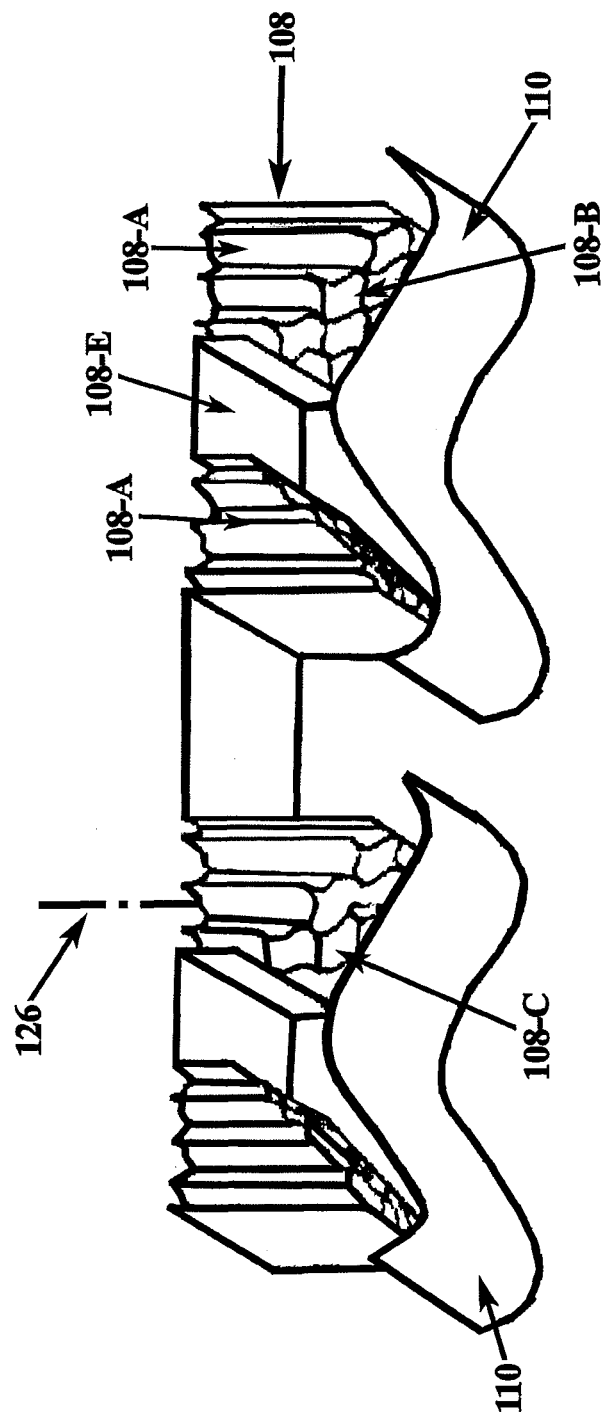
FIG. 4 is an isometric sectional view of trash filter units (108) having two baffles (110) assembled near the trash filter unit in accordance with an embodiment of the invention.
Figure 5:
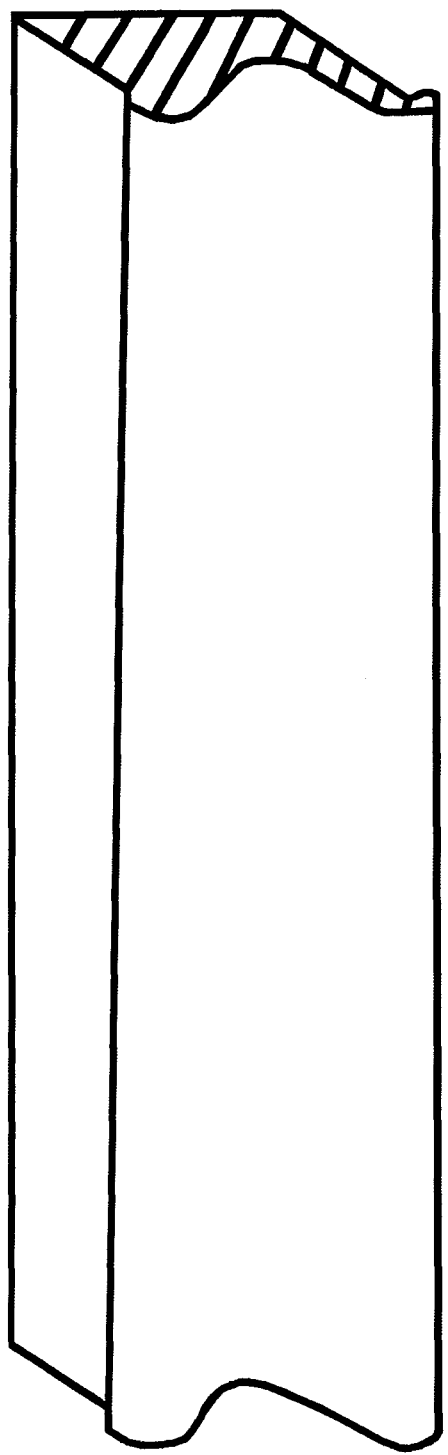
FIG. 5 is an isometric view of top cover (128) which is used to cover trash filter units (108), as per an embodiment of the invention.

The working of the present invention shall now be explained with the help of FIGS. 3 to 5 now. In FIG. 3 two trash filter units (108) assembled adjoining to each other are illustrated in accordance to an embodiment of the invention. A radiator fan (F) draws in the ambient air. The ambient air (M) flows under the plurality of baffles (110) towards the air conduits (108-C). Some of the bigger or heavier chaff and clogging agents get separated at this stage. The smaller or lighter chaff and clogging agents are pushed down the incline (108-D) mainly by the strong ambient air (M) movement between the baffle (110) and the filter line (108-A). The ambient air (M) entering the air conduits (108-C) has a direction of movement parallel to the air conduit axis (126) such that the ambient air (M) facilitates the chaff and clogging agents to be pushed down the incline (108-D). The chaff and clogging agents that are pushed down the incline (108-D) reach the open trash passage (108-E). The flushed out chaff and clogging agents fall down from the open trash passage (108-E) due to gravity. Some of the remaining chaff and clogging agents which are very minute in size pass through the air conduits (108-C) and proceed towards the radiator (not shown).

However, due to the suction effect created by the radiator fan (F) the minute chaff and clogging agents which pass through the air conduits (108-C) get sucked out. Besides, the grill plate (106) continuously vibrates because of engine vibration and vehicle movement. Hence, the chaff and clogging agents that are clinging on to the grille plate (106) and all other components attached to it fall down due to gravity. The air entering the air conduits (108-C) is in the direction of the air conduit central axis (126). This ensures the easy sliding of the chaff and clogging agents over the incline (108-D) and facilitates in the self-cleaning of the radiator grille assembly (100). Due to the incline (108-D), the chaff and clogging agents do not get stuck up on the air conduits (108-C) and fall down in the open trash passage (108-E) due to gravity. Hence, due to the constant movement of the ambient air (M), it is ensured that the chaff and clogging agents do not accumulate on the air conduits (108-C).

Further, FIG. 4 illustrates two trash filter units (108) assembled adjoining to each other in accordance with an embodiment of the invention.

FIG. 5 illustrates the top cover (128) which is used to cover trash filter units (108) as an embodiment of the present invention. The trash filter units (108) are completely covered at the top by a top cover (128) so that trash does not enter from the top. The open trash passage (108-E) of each trash filter unit (108) is open at bottom so that the accumulated trash can fall down due to gravity.

In the foregoing detailed description of embodiments of the invention, various features are grouped together in a single embodiment for the purpose of streamlining the disclosure. This method of disclosure is not to be interpreted as reflecting an intention that the embodiments of the invention require more features than are expressly recited. Rather, as the following description reflects, inventive subject matter lies in less than all features of a single disclosed embodiment. Thus, the following features are hereby incorporated into the detailed description of embodiments of the invention, with each feature standing on its own as a separate embodiment.

Although several embodiments have been described, this was for the purpose of illustrating, but not limiting, the invention. Various modifications, which will come readily to the mind of one skilled in the art, are within the scope of the invention as defined in the appended claims.

The invention claimed is:

1. A self-cleaning radiator grille assembly comprising:
   a radiator housing having a frame operable in an open and/or closed position; and
   a plurality of trash filter units forming a grill plate held by the frame, each of the plurality of trash filter units includes:
      at least one filter line having a plurality of corrugated sheets arranged parallel to each other in a manner to form an incline in such a way that hollow spaces between the corrugated sheets form air conduits opening at the incline; and an open trash passage adjacent to the filter line;

wherein an ambient air entering the air conduits has a direction of movement parallel to an air conduit axis such that ambient air facilities the chaff and the clogging agent to be pushed down the incline to reach the open trash passage, thereby enabling self-cleaning.

2. The radiator grille assembly as claimed in claim 1 further comprising hinges to facilitate the swinging of the frame in open or closed position of the radiator housing.

3. The radiator grille assembly as claimed in claim 1 wherein the frame holds the grill plate by flexible links thereby providing support to the grill plate.

4. The radiator grille assembly as claimed in claim 1 wherein an entire periphery of space between the frame and the grill plate is encompassed by a flexible shroud.

5. The radiator grille assembly as claimed in claim 4 wherein the flexible shroud covers entirely the flexible links from outside and the flexible shroud along with frame and grill plate ensure passage of air to radiator housing only through the trash filter units.

6. The radiator grille assembly as claimed in claim 1 wherein at least one baffle covers the trash filter unit.

7. The radiator grille assembly as claimed in claim 6 wherein the baffle is held together between a top holder and a bottom holder such that each of the baffles is converging over their corresponding trash filter unit when the top holder and bottom holder are fixed with the grill plate.

8. The radiator grille assembly as claimed in claim 7 wherein the top holder and bottom holder are fixed with the grill plate by spacers and bolts.

9. The radiator grille assembly as claimed in claim 1, wherein the trash filter unit includes two filter lines.

10. A self-cleaning radiator grille assembly comprising:
a radiator housing having a frame operable in an open and/or closed position;
a plurality of trash filter units forming a grill plate held by the frame, each of the said plurality of trash filter units includes:
at least one filter line, said filter line includes a plurality of corrugated sheets arranged parallel to each other in a manner to form an incline in such a way that hollow spaces between the corrugated sheets form air conduits opening at the incline; and
an open trash passage adjacent to the filter line; and
at least one baffle covering the trash filter unit and forming air passage between the baffle and the incline;
wherein an ambient air entering the air conduits has a direction of movement parallel to an air conduit axis such that the ambient air facilitates the chaff and the clogging agent to be pushed down the incline to reach the open trash passage, thereby enabling self-cleaning.

11. The radiator grille assembly as claimed in claim 10, further comprising hinges to facilitate the swinging of the frame in open or closed position of the radiator housing.

12. The radiator grille assembly as claimed in claim 10, wherein the frame holds the grill plate by flexible links thereby providing support to the grill plate.

13. The radiator grille assembly as claimed in claim 10, wherein an entire periphery of space between the frame and the grill plate is encompassed by a flexible shroud for ensuring passage of air to radiator housing only through the trash filter units.

14. The radiator grille assembly as claimed in claim 10, wherein the baffle is held together between a top holder and a bottom holder such that each of the baffles is converging over their corresponding trash filter unit when the top holder and bottom holder are fixed with the grill plate.

15. The radiator grille assembly as claimed in claim 14, wherein the top holder and bottom holder are fixed with the grill plate by spacers and bolts.

16. The radiator grille assembly as claimed in claim 10, wherein the trash filter unit includes two filter lines.

\* \* \* \* \*